United States Patent [19]
Hultdin et al.

[11] 3,851,686
[45] Dec. 3, 1974

[54] METHOD AND APPARATUS FOR FELLING TREES

[75] Inventors: Gustaf Matteus Hultdin; Ove Anders Hultdin, both of Mala, Sweden

[73] Assignee: Hultdins Verkstads AB, Mala, Sweden

[22] Filed: Dec. 14, 1973

[21] Appl. No.: 424,824

[30] Foreign Application Priority Data
Jan. 12, 1973 Sweden.............................. 7300385

[52] U.S. Cl. ........ 144/309 AC, 144/3 D, 144/34 R, 144/34 E
[51] Int. Cl. ......................................... A01q 23/08
[58] Field of Search ........ 144/2 N, 3 D, 34 R, 34 B, 144/34 A, 34 E, 309 AC

[56] References Cited
UNITED STATES PATENTS
| | | | |
|---|---|---|---|
| 1,675,413 | 7/1928 | Johnson | 144/2 N UX |
| 2,530,399 | 11/1950 | Pilgrim | 144/2 N UX |
| 3,143,813 | 8/1964 | Wells | 144/34 R X |
| 3,643,920 | 2/1972 | Widegren et al. | 144/34 A |

*Primary Examiner*—Andrew R. Juhasz
*Assistant Examiner*—W. D. Bray
*Attorney, Agent, or Firm*—Murray Schaeffer

[57] ABSTRACT

The invention relates to a method of felling trees by separating the roots from the trunk of a tree so that the roots remain substantially in their original position under the ground, by using an apparatus operated from a vehicle and comprising a frame, a machining member having cutting means for cutting of the roots and a counter support member which is pressed down through the ground to engage the roots when the machining member is forced downwardly to cut of the roots.

3 Claims, 1 Drawing Figure

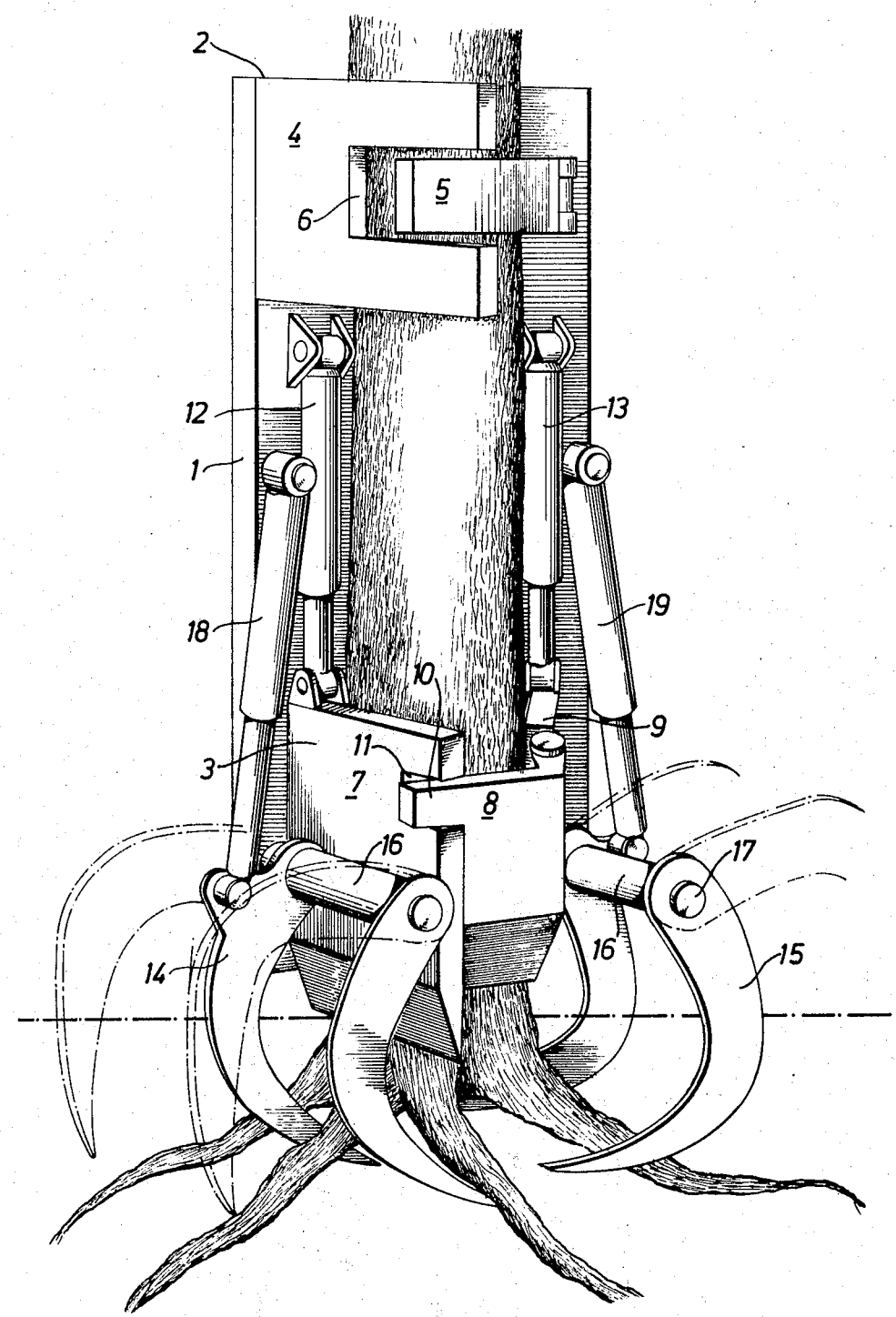

METHOD AND APPARATUS FOR FELLING TREES

The present invention relates to a method of felling trees by separating the roots, together with any root swellings, from the trunk of a tree so that the roots remain substantially in their original position under the ground, and to an apparatus for carrying out this method.

A prior apparatus is operated from a vehicle via crane or operating levers and comprises a frame joined to the operating levers, said frame being in the form of a substantially rectangular plate, and a gripping member firmly attached to the upper part of the frame for gripping and holding the trunk of the tree with clamping means, as well as a machining member provided with cutting steels for cutting off roots and root swellings, said machining member being displaceable along the frame by means of at least one force-transmitting means.

When using an apparatus of the type described above it has been found necessary to apply relatively great pressure on the trunk of the tree with the gripping member in order to fix or position the frame with respect to the trunk of the tree so that it is not moved upwards while the root section is being cut off by the cutting elements. Especially with trees having large roots or extensive root systems, this pressure has become so great that the trunk of the tree has been damaged in the area of the gripping member and it has been difficult to prevent the frame from moving upwards in spite of increased contact pressure via the gripping member, resulting in further damage to the trunk as well as other damage caused by such displacement.

The problems mentioned above of undesirable damage to the tree trunk and of achieving effective fixing or positioning of the frame are solved in a satisfactory manner by the present invention according to which a counter support means journalled in the frame is pressed down through the ground in the vicinity of the root section of the tree after the frame has been aligned with the trunk of the tree, so that said counter member is brought to cooperate or engage from below with the root section or parts thereof, after which step the cutting means is forced down through existing roots and optionally any root swellings to separate these from the trunk of the tree, against the action of the counter-means beneath. The apparatus according to the invention is characterised in that it includes a counter support means journalled in the frame and arranged to be pressed down through the ground in the vicinity of the root section of the tree after the frame has been aligned with the trunk of the tree, so that said counter-member will be brought to engage from below in the ground with the root section or parts thereof to provide counter forces when said cutting means are forced down through the roots. According to a preferred embodiment of this apparatus the counter-means comprises one or more claw elements pivotably journalled on individual shaft pins. Each claw element comprises at least one claw and is connected to a force-transmitting means, preferably a hydraulic cylinder, attached to the frame, to pivot the claw or claws in below the root section. The apparatus may optionally include a gripping member firmly or rigidly attached to the upper part of the frame for gripping the trunk of the tree. Thus, according to one aspect of the invention the apparatus comprises a frame, means for flexibly mounting said frame to a vehicle for movement of said frame with respect to said vehicle, a first member consisting essentially of a gripping member supported by said frame and arranged to grip and hold the trunk of a tree, a second member consisting essentially of a machining member supported by said frame in spaced downward relationship from said gripping member, a longitudinal guide means immovably fixed to said frame and through which said second member is movably journalled to said frame, first force-transmitting means laterally spaced from said longitudinal guide means and operable to effect relative movement of said gripping member and said machining member longitudinally away from each other along a line of movement guided by said longitudinal guide means, a third member consisting essentially of a counter support member supported by said frame and arranged to be pressed down through the ground to engage the root part or any roots of the root system, and second force-transmitting means operable to effect movement of said counter support member, said machining member having downwardly projecting exposed cutting edges as the lowermost structural part thereof, said cutting edges being adapted to be positioned to substantially circumscribe the periphery of the trunk of the tree and to press into and sever the roots extending from the trunk as said machining member is moved longitudinally away from said gripping member and as said counter support member is operably engaging the root part or roots of the trunk to effect counter forces and fix said frame with respect to the ground.

The accompanying drawing shows schematically a preferred embodiment of an apparatus according to the present invention.

The apparatus shown comprises a frame or stand 1 in the form of a rectangular solid plate, a gripping member 2 and a machining member 3. The apparatus may be arranged to be operated in all directions from a vehicle for example via hydraulically operated operating levers or crane levers joined to the frame. These levers may also be force-operated in some other manner.

The gripping member 2 is firmly attached to the frame and comprises a stationary support 4 and an arm 5 movable in relation to this support. The gripping member may also be attached to the frame by way of an intermediate journalling plate. The arm 5 faces in towards the support and is pivotably journalled about a vertical shaft, to be operated by a hydraulic cylinder, not shown. The support 4 may be angular, and in this case it is suitably provided with a bevelled inner surface. The free end of the support has a recess 6 to receive the free end of the pivotable arm 5.

The machining member 3 is displaceable along the frame 1, which may be provided, for example, with at least one oblong wedge slot to receive a guide means of guide rail arranged on or formed in the machining member or a journalling plate permanently attached to this. According to the embodiment shown, the machining member comprises cutting means including an angular cutting element 7 (one part of which is hidden by the tree trunk in the drawing) and two opposing cutting elements 8, 9 which are hinged together. The cutting means are provided with cutting edges. The inner cutting steel 9 is pivotably journalled to the frame or a special journalling plate, or to the cutting element 7. The two cutting elements 8, 9 may be operated, for example, by means of one or two hydraulic cylinders (not shown), the outer cutting steel 8 being provided with a projection 10 designed for insertion into a notch 11 in the cutting steel 7. The machining member 3 is operated by means of two hydraulic cylinders 12, 13 attached to the frame 1. During operation the machining member is guided along the frame by means of suitable guide members such as the guide means mentioned previously which slide in a groove or wedge slot in the frame.

The gripping member and machining member of the apparatus can be varied and modified in many different ways, for example as shown and described in U.S. Pat. application Ser. No. 204,659 of Dec. 3, 1971 now Pat. No. 3,822,730. Since the novelty of the present invention does not reside per se in the actual construction of these members, it is unnecessary to list alternative embodiments but reference is made to said U.S. application for example.

The improved apparatus according to the invention includes a special means which acts as a support providing counter forces to the cutting steels, operatably located in front or under the steels, while the steels are machining the root section of the tree. In the embodiment shown in the drawing this counter support means comprises two pivotable claw welements 14, 15 which can be operated individually or together. Each claw element comprises two claws which are firmly arranged on a tubular intermediate piece 16 and pivotably journalled on a shaft pin 17 projecting from the frame. The claw elements are arranged to be operated by individual hydraulic cylinders 18, 19 attached to the frame, the piston rods being joined to the inner claws in the claw elements 14, 15.

When using the apparatus described for felling trees of standing timbers, it is aligned with the tree trunk in the vicinity of the ground, after which the movable arm 5 and cutting steels 8, 9 of the gripping member and machining member, respectively, can be pivoted in towards the trunk. The claw elements 14, 15 of the counter support member are then pivoted from the positioned shown on the drawing in broken lines, down to the position shown in unbroken lines, whereupon the claws are pressed down through the ground and the root system to engage or cooperate from below with the root core and/or one or several of the main roots of the root system. When the claw elements have assumed their operative position, the cutting steels of the machining member are forced down with the help of the hydraulic cylinder 12, 13, so that the roots and any root swellings are gradually or successively cut off. When the root system has been separated or substantially separated from the trunk of the tree, the claw elements are pivoted up to inoperative position, after which the tree can be lifted and any remaining roots can be cut off with the cutting steels before the apparatus is manoeuvered to permit controlled lowering the tree onto the ground or a receiving machine or vehicle.

By using a counter support member engaging or co-operating with the root part of the standing tree, in accordance with the present invention, the frame is efficiently secured and is thus prevented from moving up as the cutting steels are pressed down through the root system. It is therefore not necessary to use any great pressure which might damage the trunk, as was the case previously in order to secure the frame to the trunk of the tree using the clamping means of the gripping member. The gripping member serves only as extra support and may even be omitted in certain aspects of the invention, especially when a separate gripping means is used to surround and hold the trunk at a suitable distance above the apparatus.

The invention is not limited to the embodiment of the counter support means shown in the drawing. It can be varied and modified in many ways within the scope of the following claims in order to achieve the desired result with a counter support placed in front of the cutting steels, seen in the direction of operation. Thus the counter-member or counter-means may comprise only one claw element and the number of claws may be less or more than as shown in the drawing. Instead of claw elements pivotable on a shaft pin, a counter-member may be used which comprises one or more rods displaceable in longitudinal direction, for example hydraulically operated, said rods being journalled directly or indirectly on the frame and preferably provided with pointed ends to facilitate their insertion into the ground around the root part. In order to achieve the desired counter support action, each rod may be provided with one or more outwardly directed pins, claws, projections or similar elements which may be rigid, retractible or extendible, or can be pivotable up and down, and which are arranged to engage or cooperate from below with roots and other root parts in order to achieve the desired counter support action after the rod or rods have been pressed down into the ground and optionally moved back a little. Furthermore, each rod may be pivotable and may be displaceable in vertical direction or obliquely inwardly towards the root part.

We claim

1. A method of felling trees by separating the roots from the trunk of a tree so that said roots remain substantially in their original position under the ground, using an apparatus operated from a vehicle via crane or operating levers and comprising a frame joined to the operating levers, said frame being in the form of a substantially rectangular plate and a machining member having cutting means for cutting off said roots, said machining member being displaceable along the frame by means of force-transmitting means, the method being characterized by pressing a counter-member journalled in the frame down through the ground in the vicinity of the root section of the tree after the frame has been aligned with the trunk of the tree, so that said counter-member will be brought to engage from below in the ground with the root section or parts thereof, and forcing down said cutting means through existing roots to separate these from the trunk of the tree, against the action of said countermember beneath.

2. An apparatus for felling trees by separating the roots from the trunk of a tree so that said roots remain substantially in their original position under the ground, said apparatus being operated from a vehicle via crane or operating levers and comprising a frame joined to the operating levers, said frame being in the form of a substantially rectangular plate and a machining member having cutting means for cutting off said roots, said machining member being displaceable along the frame by means of force-transmitting means, characterized in that the apparatus includes a countermember journalled in the frame and arranged to be pressed down through the ground in the vicinity of the root section of the tree after the frame has been aligned with the trunk of the tree, so that said counter-member will be brought to engage from below in the ground with the root section or parts thereof to provide counter forces when said cutting means are forced down through the roots.

3. An apparatus according to claim 2, characterized in that said counter-member comprises one or more claw elements pivotably journalled on individual shaft pins projecting from the frame, each claw element comprising at least one claw and being connected to a force-transmitting means attached to the frame to pivot and press the claw or claws in below the root section.

* * * * *